United States Patent
Boe

(10) Patent No.: US 10,122,167 B2
(45) Date of Patent: Nov. 6, 2018

(54) SUBSEA POWER DISTRIBUTION SYSTEM AND METHOD

(71) Applicant: Siemens Aktiengesellschaft, Munich (DE)

(72) Inventor: Ove Boe, Tanem (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 14 days.

(21) Appl. No.: 15/111,520

(22) PCT Filed: May 7, 2015

(86) PCT No.: PCT/EP2015/060056
§ 371 (c)(1),
(2) Date: Jul. 14, 2016

(87) PCT Pub. No.: WO2015/197243
PCT Pub. Date: Dec. 30, 2015

(65) Prior Publication Data
US 2017/0104329 A1   Apr. 13, 2017

(30) Foreign Application Priority Data

Jun. 27, 2014   (EP) .................... 14174804

(51) Int. Cl.
*H02J 1/00* (2006.01)
*H02J 3/00* (2006.01)
(Continued)

(52) U.S. Cl.
CPC ............... *H02J 3/00* (2013.01); *E21B 41/00* (2013.01); *H02K 5/132* (2013.01); *H02M 5/40* (2013.01); *H02P 27/06* (2013.01); *E21B 43/128* (2013.01)

(58) Field of Classification Search
CPC .......... H02J 3/00; E21B 41/00; E21B 43/128; H02P 27/06; H02M 5/40; H02K 5/132
See application file for complete search history.

(56) References Cited

U.S. PATENT DOCUMENTS 8,456,116 B2 * 6/2013 Burdick ................. H02P 27/06
                                                            318/400.29
8,604,822 B2 * 12/2013 Schroeder ............. G01R 31/42
                                                            324/762.08
(Continued)

FOREIGN PATENT DOCUMENTS

EP   2194638 A2   6/2010
EP   2538540 A1   12/2012
(Continued)

OTHER PUBLICATIONS

International Search Report and Written Opinion dated Jul. 17, 2015.
European Office Action dated Oct. 16, 2014.

*Primary Examiner* — Kenneth B Wells
(74) *Attorney, Agent, or Firm* — Harness, Dickey & Pierce, P.L.C.

(57) ABSTRACT

A subsea power distribution system is provided. The subsea power distribution system includes a power input for receiving electrical power at a first voltage level and an input transformer coupled to the power input and adapted to transform received electrical power to a second voltage level which is lower than the first voltage level. A distribution circuit distributes received electrical power to two or more power distribution paths. At least one rectifier unit receives transformed electrical power from the input transformer and outputs rectified electrical power. The two or more power distribution paths each have an inverter configured to receive rectified electrical power from the rectifier unit and to output AC electrical power at a third voltage level, and a
(Continued)

distribution path transformer coupled to the respective inverter and configured to transform the output AC electric power to a fourth voltage level which is higher than the third voltage level.

26 Claims, 4 Drawing Sheets

(51) Int. Cl.
*H02M 5/40* (2006.01)
*H02P 27/06* (2006.01)
*H02K 5/132* (2006.01)
*E21B 41/00* (2006.01)
*E21B 43/12* (2006.01)

(56) References Cited

U.S. PATENT DOCUMENTS

| | | |
|---|---|---|
| 9,118,206 B2 * | 8/2015 | Peterson .............. H01H 11/00 |
| 2006/0109701 A1 * | 5/2006 | Morcov ................ H02J 3/34 |
| | | 363/148 |
| 2011/0251728 A1 | 10/2011 | Batho et al. |

FOREIGN PATENT DOCUMENTS

| | | |
|---|---|---|
| EP | 2623838 A1 | 8/2013 |
| WO | WO 2007071266 A1 | 6/2007 |
| WO | WO 2009135730 A1 | 11/2009 |
| WO | WO 2011124470 A2 | 10/2011 |
| WO | WO 2012164029 A2 | 12/2012 |
| WO | WO 2013039404 A1 | 3/2013 |

* cited by examiner

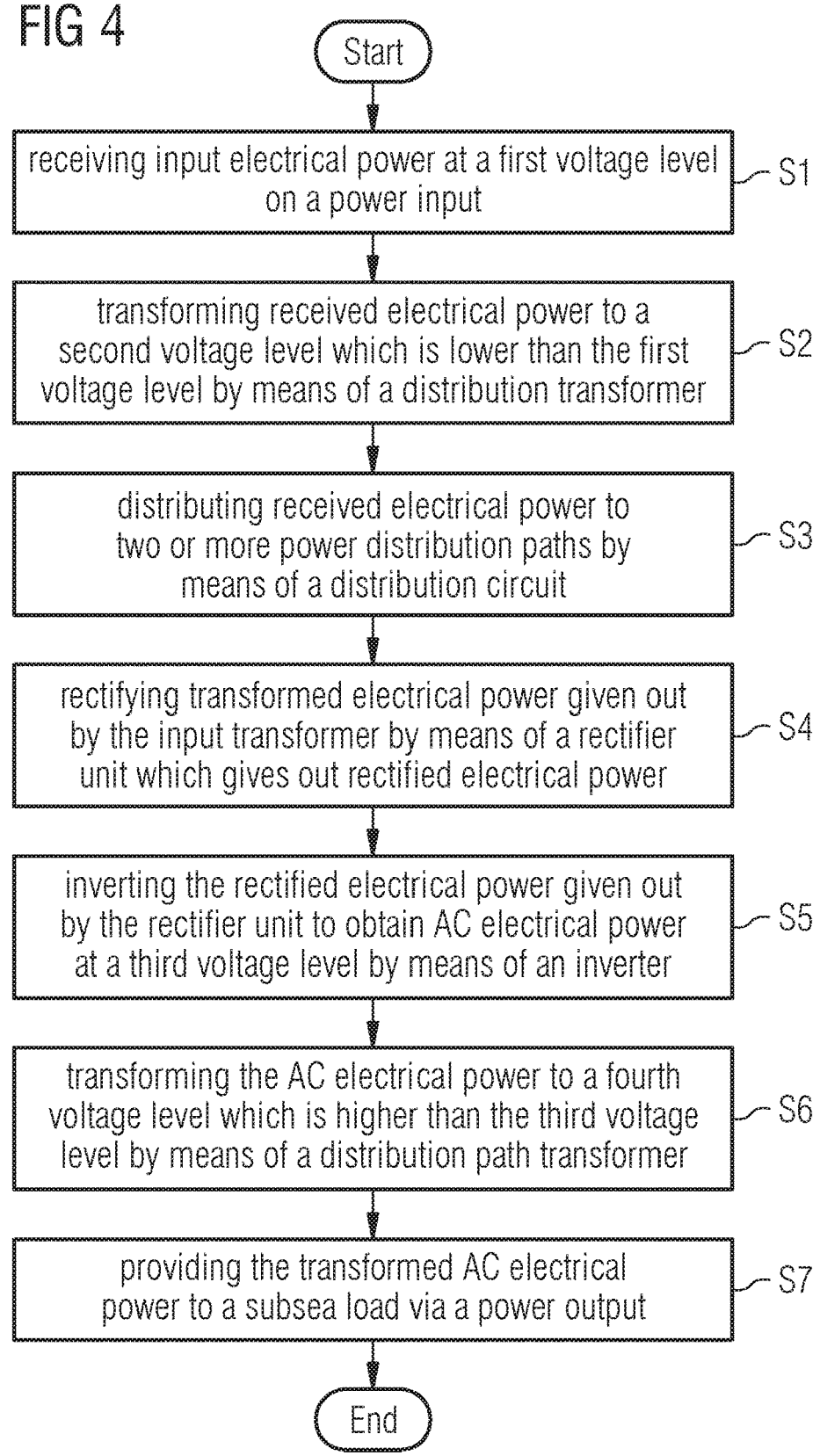

SUBSEA POWER DISTRIBUTION SYSTEM AND METHOD

PRIORITY STATEMENT

This application is the national phase under 35 U.S.C. § 371 of PCT International Application No. PCT/EP2015/060056 which has an International filing date of May 7, 2015, which designated the United States of America and which claims priority to European patent application number EP14174804.6 filed Jun. 27, 2014, the entire contents of which are hereby incorporated herein by reference.

FIELD

At least one embodiment of the invention generally relates to a subsea power distribution system for distributing electric power to different loads. At least one embodiment of the invention further generally relates to a method of operating a subsea power distribution system.

BACKGROUND

Due to the increasing energy demand, offshore oil and gas production is moving into deeper waters. Wells for hydrocarbon production can be located in water depths down to 3,000 m or more and a considerable distance from shore. For ensuring an efficient and secure production, processing facilities are being installed at the ocean floor in proximity to such subsea well. Installations on the ocean floor can comprise a range of components, including pumps, compressors and the like which require electric power for operation. Power supply can occur via a subsea power grid installed on the ocean floor, which may for example comprise a subsea transformer 91, a subsea switchgear 92, and a subsea variable speed drive (VSD) 93 for powering subsea loads 94, as shown in FIG. 1.

In order to be capable of powering the subsea installation, voltage is supplied at a high voltage level to subsea transformer 91 and then transformed to a distribution voltage level, which may, for example, be about 36 kV. In such example, switchgear 92 provides 36 kV distribution, and the subsea VSD 93 may provide an output voltage of about 6,000 V. The cables and connectors used between the different components of the subsea installation are rated for the distribution voltage, e.g. for the above-mentioned 36 kV.

When installed subsea, the components of the subsea power grid are exposed to pressures up to or even in excess of 300 bar (at a depth of 3,000 m). To protect the components from the corrosive environment of the surrounding seawater and to deal with the high pressures, pressure resistant enclosures or pressure compensated enclosures can be used.

The components, such as the transformer 91, the switchgear 92 and the variable speed drive 93 are relatively heavy and large sized. Furthermore, they are relatively expensive to produce. In particular for smaller loads, the supply with electric power via components of such subsea power grid might be expensive, and might require these relatively big and heavy modules, such as a subsea variable speed drive 93.

To power such small individual consumers, it is known to provide a single power supply cable, for example from a topside installation, such as an offshore platform or an onshore facility. Although such solution does not require the relatively expensive and heavy subsea components, it requires a subsea cable or an umbilical for each load, which, depending on the length, can also be expensive and difficult to install.

The document EP 2 538 540 A1 discloses a subsea power grid having a power cable, a subsea transformer and a subsea main connection unit for distributing electric power to a number of loads. Each load may comprise a variable speed drive.

The document WO 2009/135730 A1 discloses a power supply device for a variable speed drive arranged at the bottom of the ocean comprising a power converter.

The document WO 2012/164029 A2 discloses electrical architecture for power distribution to subsea equipment comprising at least one variable speed drive.

It is in particular desirable to be capable of powering relatively small individual consumers of a subsea installation located at different positions subsea without the need for such cables or the above mentioned expensive and heavy subsea components.

SUMMARY

Accordingly, the inventor has recognized that there is a need to improve the power supply to a load located subsea, and in particular to provide a cost-efficient power supply which does not require large or heavy subsea components. Further, there is a need to mitigate at least some of the drawbacks mentioned above.

The claims describe embodiments of the invention.

According to an embodiment of the invention, a subsea power distribution system is provided which comprises a power input for receiving electrical power at a first voltage level, an input transformer coupled to the power input and adapted to transform received electrical power to a second voltage level which is lower than the first voltage level. The power distribution system further comprises a distribution circuit for distributing received electrical power to two or more power distribution paths and at least one rectifier unit that receives transformed electrical power from the input transformer and outputs rectified electrical power. Each of the two or more power distribution paths comprises an inverter configured to receive rectified electrical power from the rectifier unit and to output AC electrical power at a third voltage level, a distribution path transformer coupled to the respective inverter and configured to transform the output AC electrical power to a fourth voltage level which is higher than the third voltage level, and a power output for providing the transformed AC electrical power to a subsea load.

According to a further embodiment of the present invention, a method of operating a subsea power distribution system is provided. The method comprises receiving input electrical power at a first voltage level on a power input, transforming received electrical power to a second voltage level which is lower than the first voltage level via a distribution transformer, distributing received electrical power to two or more power distribution paths via a distribution circuit and rectifying transformed electrical power given out by the input transformer via a rectifier unit which gives out rectified electrical power.

It is to be understood that the features mentioned above and those yet to be explained below can be used not only in the respective combinations indicated, but also in other combinations or in isolation, without leaving the scope of the present invention.

BRIEF DESCRIPTION OF THE DRAWINGS

The foregoing and other features and advantages of the invention will become further apparent from the following detailed description read in conjunction with the accompanying drawings. In the drawings, like reference numerals refer to like elements.

FIG. 4 is a flow diagram illustrating a method according to an embodiment of the invention.

DETAILED DESCRIPTION OF THE EXAMPLE EMBODIMENTS

Figure 1:
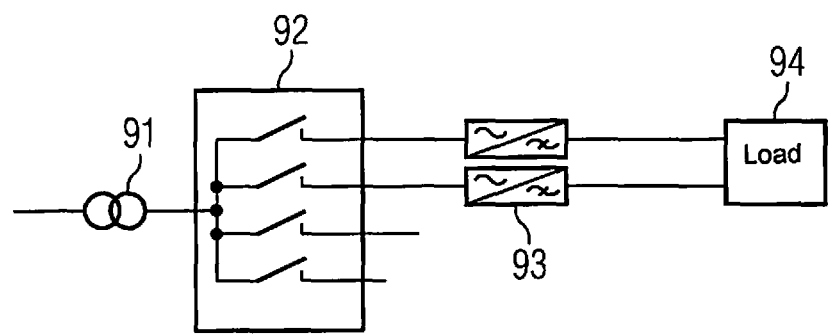
FIG. 1 is a schematic diagram showing a subsea power system known in the prior art.

According to an embodiment of the invention, a subsea power distribution system is provided which comprises a power input for receiving electrical power at a first voltage level, an input transformer coupled to the power input and adapted to transform received electrical power to a second voltage level which is lower than the first voltage level. The power distribution system further comprises a distribution circuit for distributing received electrical power to two or more power distribution paths and at least one rectifier unit that receives transformed electrical power from the input transformer and outputs rectified electrical power. Each of the two or more power distribution paths comprises an inverter configured to receive rectified electrical power from the rectifier unit and to output AC electrical power at a third voltage level, a distribution path transformer coupled to the respective inverter and configured to transform the output AC electrical power to a fourth voltage level which is higher than the third voltage level, and a power output for providing the transformed AC electrical power to a subsea load.

In such configuration, a high voltage level achieving an effective power transmission can be used, while power distribution occurs at a lower voltage level. Accordingly, the components for powering the subsea load, such as the distribution circuit, the rectifier unit and the inverter can be kept relatively small and can furthermore be produced cost-efficiently. Also, by providing an inverter and a distribution path transformer in each power distribution path, the output voltage can be adjusted to the respective subsea load. The frequency of the output AC electrical power and thus the speed of the load may be controlled by way of the inverter. The distribution path transformer may be configured to provide galvanic isolation. Accordingly, even if a load coupled to one of the power distribution paths is operated at a fault current level, the power distribution to the remaining loads coupled to the subsea power distribution system may continue, or may even remain unaffected.

It should be clear that the rectifier unit may be coupled directly or indirectly to the input transformer, it may for example be coupled to the input transformer via the distribution circuit.

The subsea power distribution system may be provided for supplying power to equipment of a subsea well, in particular to equipment related to two or more wellheads. In particular, it may be configured to supply electric power to two or more electric submersible pumps (ESPs). The subsea load may for example be an electric motor, in particular a motor of such ESP. By such power distribution system, subsea loads located at different subsea wellheads may be powered in an efficient and cost-effective manner.

In an embodiment, the power input, the input transformer, the distribution circuit and the at least one rectifier unit form part of a subsea power distribution unit. Each power distribution path may comprise a subsea drive unit which comprises the respective inverter, distribution path transformer and power output. Accordingly, by providing the distribution and the drive-related components in separate units, which may be separate modules, a flexible and compact configuration of the subsea power distribution system can be achieved. In other embodiments, the rectifier unit may not be comprised within the subsea power distribution unit but within the respective subsea drive units.

Each power distribution path may for example comprise an intermediate power output provided at the subsea power distribution unit, an intermediate power input at the subsea drive unit, and a subsea cable connection between the intermediate power output and the intermediate power input for transmitting electrical power. The subsea power distribution unit and the two or more subsea drive units may each have a separate subsea enclosure. The intermediate power input and power output may for example be provided by subsea connectors, in particular by wet-mateable subsea connectors. The subsea cable may for example be a jumper cable.

The cable between the intermediate power output and the intermediate power input may have a considerable length, for example more than 100 m, more than 500 m, or even more than 1,000 m. Accordingly, power can be distributed efficiently to different parts of a subsea installation, for example to ESPs of subsea wells located kilometers apart.

The subsea power distribution unit and the two or more subsea drive units may be separate modules that may be located distant from each other at different subsea locations. These different subsea locations may be several hundred meters or even kilometers apart.

In an example, the subsea power distribution system may be configured to distribute electrical power to subsea well equipment located at different subsea wellheads, in particular to ESPs, wherein the two or more subsea drive units comprise a first subsea drive unit located in proximity to a first wellhead and a second subsea drive unit located in proximity to a different second wellhead.

In an embodiment, the rectifier unit is connected between an output of the input transformer and the distribution circuit. The distribution circuit may be a DC distribution circuit, i.e. it may be configured to distribute DC electrical power. Each of the two or more power distribution paths may be supplied with rectified electrical power from this rectifier unit via the DC distribution circuit. In such configuration, only a single rectifier unit may need to be provided.

The DC distribution circuit may for example comprise bus bars for distributing the DC electrical power. In such configuration, the electrical power may be distributed to modules comprising the inverter and the distribution path transformer which are located significant distances away from the module comprising the DC distribution circuit. In particular, such DC distribution may allow the transmission of power over relatively long distances even at a relatively low voltage level.

In another embodiment, the power distribution system may comprise a rectifier unit for each of the power distribution paths. Accordingly, the distribution circuit may be an AC distribution circuit, it may in particular be configured to distribute AC electrical power. If the system is separated into modules as mentioned above, the rectifier in each power distribution path may either be provided before the intermediate power output, so that DC power is transmitted over the cable connection, or behind the intermediate power input, so that AC electrical power is transmitted over the cable connection.

In an embodiment, the rectifier unit and the inverter of a power distribution path may form a frequency converter unit, in particular a variable speed drive. Accordingly, each power distribution path may comprise such converter, which may allow a frequency conversion of the supplied electrical power in order to control the speed of the connected load, e.g. a connected electrical motor.

Accordingly, different embodiments are conceivable in which the distribution circuit may for example distribute transformed electrical power received from the input transformer or rectified DC electrical power received from the rectifier unit.

In an embodiment, the first voltage level may be a medium voltage level, in particular it may be a voltage level between about 1,000 V and about 80,000 V, preferably between about 4,000 V and about 50,000 V, more preferably between 20,000 V and 40,000 V. As an example, electrical power may be received at the power input at a voltage level of about 32,000 V or about 36,000 V.

The second voltage level may be at least a factor of 5, preferably at least a factor of 10, more preferably at least a factor of 20 lower than the first voltage level. In some applications, the second voltage level may even be 50 times lower than the first voltage level. This means that the input transformer may have a corresponding transformation ratio of at least 5:1, at least 10:1, at least 20:1 or even at least 50:1.

The second voltage level and the third voltage level may each be within a range of about 200 V to about 5,000 V, preferably of about 500 V to about 4,000 V, more preferably of about 500 V to about 2,000 V.

Depending on the configuration of the rectifier unit and the respective inverter, the second voltage level and the third voltage level may be similar or may be different. As an example, the second voltage level given out by the input transformer may be around 700 V, for example 690 V, and the rectifier unit may give out DC electrical power at a voltage level of about 1,000 V. The distribution circuit may thus operate at about 1,000 V DC. In other configurations, it may operate at higher voltages, for example up to 4,000 V. Increased transmission distances may thus be achieved. Depending on the transmission distance between the rectifier unit and the inverter in the respective power distribution path, the voltage received at the inverter may be lower than the voltage given out by the rectifier.

In an embodiment, the fourth voltage level which is produced by the distribution transformer may be within a range of about 1,000 V to about 10,000 V, preferably between about 1,000 V to about 6,000 V. Depending on the load and the distance between the distribution path transformer and the load, the voltage that is given out by the distribution path transformer can be adjusted. For an ESP and other applications, it may for example lie within a range of about 2,000 to 4,000 V.

Again, the voltage received at the subsea load may be lower than the voltage produced by the distribution path transformer, since there might be a significant distance between them. As an example, in an ESP application, the electric submersible pump may be located downhole at a distance of several kilometers to the distribution path transformer, in particular to the subsea drive unit comprising such distribution path transformer.

The distribution path transformer may be a step-up transformer.

In an embodiment, each power distribution path may comprise a semiconductor switch. Additionally or alternatively, each power distribution path may comprise a mechanical switch, in particular a contactor. Such semiconductor switch may for example use an IGBT or other semiconductor element for controlling or switching the electrical power transmitted in the respective power distribution path. It may for example be used to control or reduce inrush currents when starting up the inverter of the respective power distribution path. The semiconductor switch may accordingly be configured to act as a soft-starting device, for example by chopping the voltage.

The semiconductor switch may be controllable to control the output electrical power provided at the power output of the respective power distribution path. The semiconductor switch may for example be configured to be capable of switching off a fault current, which it may achieve relatively fast. The influence of a fault in the respective inverter on the rest of the subsea power distribution system may thus be reduced.

By providing a mechanical switch in addition or alternatively, a safe disconnection of outgoing connectors, for example the power output of the respective power distribution path, or a respective intermediate power output, can be achieved, which is beneficial for installation at maintenance operations. The semiconductor switch and the mechanical switch may be installed in series in the respective power distribution path.

Furthermore, the subsea power distribution system may comprise one or more filters. A filter unit may, for example, be installed behind (downstream of) the inverter, for example between the inverter and the distribution path transformer, or the distribution path transformer and the load, in the respective power distribution path. A filter unit may additionally or alternatively be installed before or behind the rectifier unit, e.g. before the power distribution circuit or in each power distribution path.

In an embodiment, the subsea power distribution system may further comprise a controller adapted to control at least the inverters of the two or more power distribution paths. The controller may for example control the frequency of the AC electric power produced by the respective inverter, in order to control the speed of for example an electrical motor which is connected as a load to the respective power output. Such controller may furthermore be configured to control the above mentioned semiconductor switches, for example for said soft start or inrush current control, and may control the above-mentioned mechanical switches. The controller may be provided subsea, e.g. in form of a subsea control module or inside the subsea distribution unit, or may be provided topside and may control the respective component via control signals submitted over an umbilical, a subsea cable, wirelessly or the like.

In an embodiment, the distribution circuit is a DC distribution circuit. The first voltage level may be a medium or high-voltage level, the DC distribution may occur at a low voltage level, and the fourth voltage level which is produced by the respective distribution path transformer may be a medium voltage level. Medium voltage may for example range between about 1,000 and about 50,000 V, and high voltage may be a voltage higher than 1,000 V or higher than 50,000 V, depending on the definition.

According to a further embodiment of the present invention, a method of operating a subsea power distribution system is provided. The method comprises receiving input electrical power at a first voltage level on a power input, transforming received electrical power to a second voltage level which is lower than the first voltage level via a distribution transformer, distributing received electrical power to two or more power distribution paths via a distribution circuit and rectifying transformed electrical power given out by the input transformer via a rectifier unit which gives out rectified electrical power.

For each of the two or more power distribution paths, the method further comprises the steps of inverting the rectified electrical power given out by the rectifier unit to obtain AC electrical power at a third voltage level via an inverter, transforming the AC electrical power to a fourth voltage level which is higher than the third voltage level via a distribution path transformer, and providing the transformed AC electrical power to a subsea load via a power output.

By such method, advantages similar to the ones outlined further above with respect to the subsea power distribution system may be achieved.

In embodiments of the method, the method may be performed by the above described subsea power distribution system in any of the outlined embodiments and configurations. The method may furthermore comprise steps as described above with respect to embodiments and configurations of the subsea power distribution system.

In the following, embodiments of the invention will be described in detail with reference to the accompanying drawings. It is to be understood that the following description of the embodiments is given only for the purpose of illustration and is not to be taken in a limiting sense.

It should be noted that the drawings are to be regarded as being schematic representations only, and elements in the drawings are not necessarily to scale with each other. Rather, the representation of the various elements is chosen such that their function and general purpose become apparent to a person skilled in the art. It is also to be understood that the physical or functional units illustrated and described herein with respect to the different embodiments do not necessarily need to be implemented as physically separate units. One or more physical or functional blocks or units may be implemented in a common circuit, chip, circuit element or unit, while other physical or functional blocks or units shown may be implemented in separate circuits, chips, circuit elements or units.

Figure 2:
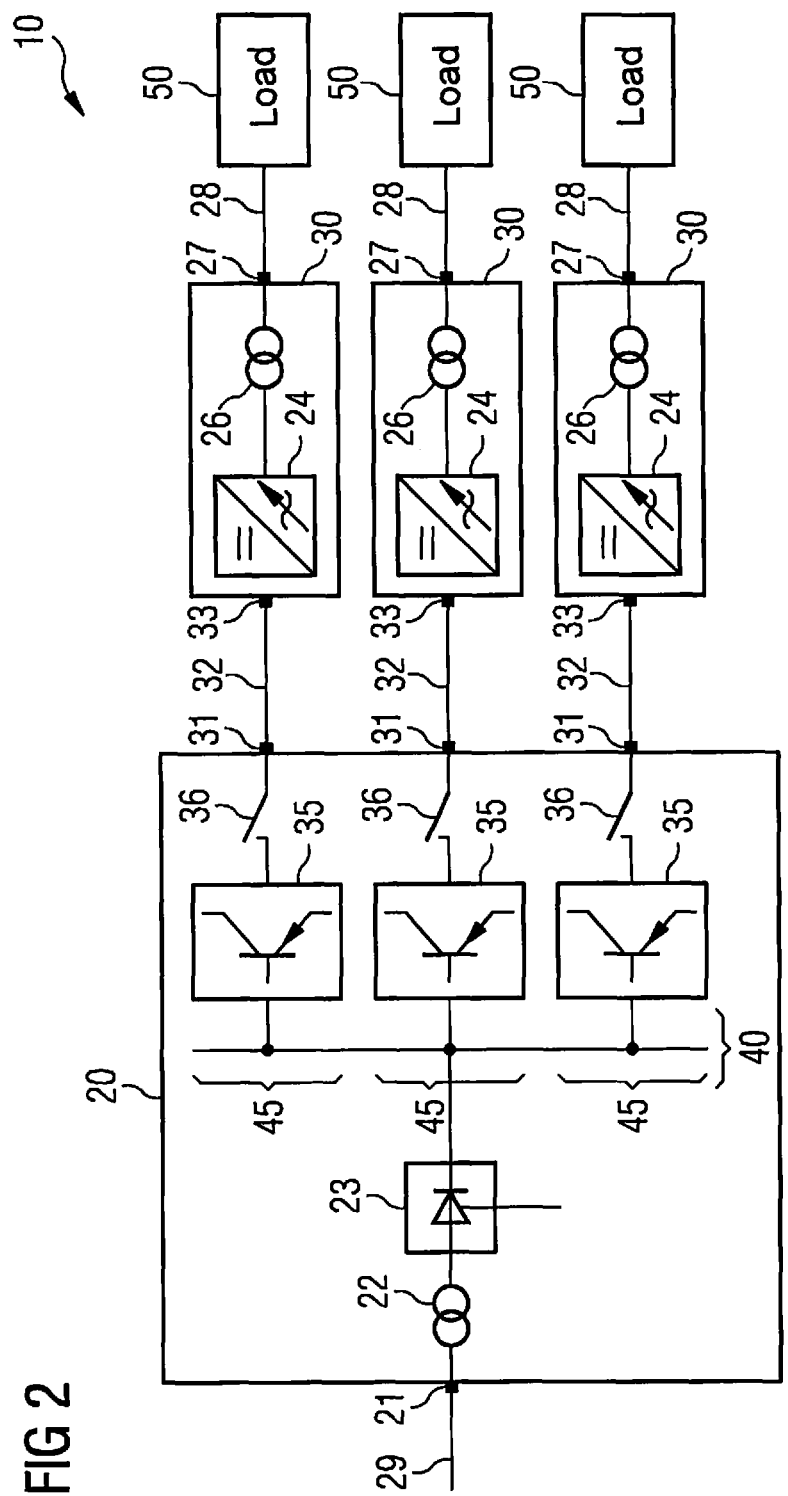
FIG. 2 is a schematic drawing showing a block diagram of a subsea power distribution system according to an embodiment of the invention.

FIG. 2 is a schematic diagram showing a subsea power distribution system 10 according to an embodiment of the invention. The subsea power distribution system 10 comprises a power input 21, which can be implemented as a subsea connector, for example a wet-mateable connector. On the power input 21, AC (alternating current) electrical power is received via the subsea cable 29. The power source may for example be provided on a topside installation, for example on a floating platform or other floating vessel, or an onshore installation. The power source may also be provided by a larger subsea installation, the subsea cable 29 may for example be connected to a subsea switchgear, such as the subsea switchgear 92 illustrated in FIG. 1.

The subsea power distribution system 10 further comprises an input transformer 22, which is a step-down transformer and which converts a first voltage level at which the AC electrical power is received at the power input 21 to a lower second voltage level. The rectifier unit 23 is connected to input transformer 22. It rectifies the transformed electrical power and provides it to a distribution circuit 40. Distribution circuit 40 may be implemented by way of bus bars from which different power distribution paths 45 branch off. The power distribution paths 45 reach from the power distribution circuit 40 to a respective power output 27. In the example of FIG. 2, three power distribution paths and thus three power outputs 27 are provided by the subsea power distribution system 10.

In the example of FIG. 2, rectified electrical power is provided to the distribution circuit 40, so that a DC power distribution is realized. Another possible implementation is the realization of an AC power distribution, in which the rectifier unit 23 is provided behind (or downstream of) the power distribution circuit 40. For example, one rectifier 23 can be provided in each power distribution path 45. Such configuration is explained further below with respect to FIG. 3.

In each power distribution path 45, an inverter 24 is provided, which converts the DC electrical power from the DC distribution to AC electrical power of controllable AC frequency. The local DC distribution implemented by distribution circuit 40 thus feeds the individual inverters 24. A distribution path transformer 26 is connected to each inverter 24. The distribution path transformer 26 adjusts the output voltage of the inverter to the voltage level that is required by the load 50. Furthermore, the distribution path transformer 26 provides galvanic isolation between the different loads 50, thus enabling the operation of a load 50 with an earth fault without influencing the remaining parts of the subsea power distribution system 10.

The inverter 24 gives out AC electrical power at a third voltage level which is transformed by the distribution path transformer 26 to a fourth voltage level that is higher than the third voltage level. Distribution path transformer 26 is a step-up transformer. The transformed AC electrical power provided at the power output 27 is transmitted to a subsea load 50, for example via a subsea cable or downhole connection 28. Power output 27 can be implemented via a subsea connector, for example a wet-mateable connector.

In the embodiment of FIG. 2, the subsea power distribution system 10 is modularized by providing one subsea power distribution unit 20 comprising the input transformer 22, the rectifier unit 23 and the distribution circuit 40, and three subsea drive units 30, one for each power distribution path 45, each comprising the respective inverter 24 and distribution path transformer 26.

Accordingly, by such separation, the subsea drive units 30 can be provided separately and spaced apart in order to power subsea loads 50 at different locations of a subsea installation, for example for powering components installed at different subsea wells.

Power distribution occurs within the subsea power distribution unit 20. The subsea distribution unit 20 thus comprises for each power distribution path 45 an intermediate power output 31. Each subsea drive unit 30 comprises a corresponding intermediate power input 33, which is connected via a cable connection 32 to the respective intermediate power output 31. In some applications, the cable connection 32 may be relatively short, for example tens or hundreds of meters, while in other applications, it may be a relatively long cable connection, e.g. exceeding a length of one kilometer. In particular the use of DC distribution may allow the transmission of power over relatively long distances even at low voltage levels.

In the embodiment of FIG. 2, the subsea power distribution system 10 further comprises a semiconductor switch 35 in each power distribution path 45. The semiconductor switches 35 can be implemented by using an insulated gate bipolar transistor (IGBT), but other implementations are also conceivable. The semiconductor switch may be configured to act as a soft starting device and may chop the voltage at start-up of the inverters 24 and thus reduce the inrush currents. Furthermore, the semiconductor switches 35 may be configured to have the ability to switch off a fault current in case of a fault in the respective power distribution path 45 or the load connected thereto. By making use of such semiconductor switch, the fault current may be switched off very fast, thus reducing the influence of a fault in for example one of the subsea drive units 30 on the rest of the subsea distribution system 10.

Furthermore, a mechanical switch 36 may be provided in each power distribution path 45. This may allow a safe disconnection of the outgoing connectors, in particular the intermediate power outputs 31, for installation and maintenance. The mechanical switches 36 may be implemented as mechanical contactors, for example latched contactors. In particular, the contactor described in the document EP 2 680 288 A1 may be used. Accordingly, in case of a fault, the semiconductor switch 35 may interrupt the fault current quickly and effectively without arcing, and the mechanical switch 36 may be opened afterwards in order to allow a secure disconnection of the cable connection 32 or the load 50 for removing the fault. It should be noted that the semiconductor switch 35 and the mechanical switch 36 are optional, and either one of them or both may be provided. The semiconductor switches 35 and the mechanical switches 36, if provided, may be considered to form part of the distribution circuit 40.

In the embodiment of FIG. 2, the subsea power distribution unit 10 provides power distribution for three subsea loads 50. It should be clear that in other configurations, more or fewer power distribution paths may be provided. The subsea power distribution unit 20 may for example have two, three, four, five, six or more intermediate power outputs 31, and a respective number of subsea drive units 30 may be provided. For most applications, one subsea drive unit 30 is provided for each subsea load, yet in other configurations, more than one subsea drive unit 30 may power a subsea load 50.

The subsea power distribution unit 20 and the subsea drive units 30 are each provided with their own separate subsea enclosure. This may for example be an oil-filled pressure compensated enclosure. Components within the respective unit 20 or 30 may furthermore be provided with their own enclosure, to achieve a double wall configuration. In some embodiments, both the subsea power distribution unit and the subsea drive units 30 may employ pressure compensated, dielectric liquid-filled enclosures. In other embodiments, the subsea enclosure of the subsea power distribution unit 20 and/or the subsea enclosure of one or more subsea drive units 30 may be a pressure resistant enclosure maintaining a close to atmospheric pressure inside (e.g. below 5 bar, for example about 1.5 bar). While the pressure compensated enclosures allow the use of relatively thin walled, compact and light enclosures, the use of pressure resistant enclosures maintaining a close to atmospheric pressure inside allows the use of conventional electric and electronic components.

The subsea load 50 may for example comprise an AC electric motor, in particular the motor of an electric submersible pump (ESP). By providing electrical power with controllable AC frequency at the power outputs 27, such AC electric motor can be driven at adjustable speed by adjusting the AC frequency. For this purpose, the subsea power distribution system 10 may comprise a controller (not shown) which individually controls each of the inverters 24. Furthermore, such controller may also control the semiconductor switches 35 and the mechanical switches 36. Note that such controller may either be provided subsea or topside, and it may not need to be provided as a single unit, but can be distributed into plural units. In particular, a redundant configuration for the controller is beneficial.

The inverters 24 can be three-phase inverters, i.e. they may produce a three-phase AC power output. Correspondingly, the distribution path transformers 26 may be three-phase transformers, and the power output 27 may provide a three-phase AC power output. Note that the different phases are not shown in the single line diagram of FIG. 2. Similarly, the power input 21 may receive three-phase AC electrical power, which is transformed by a three-phase input transformer 22. The rectifier unit 23 may rectify the three-phase AC electric power to DC electric power for distribution.

The power input 21 may be configured to receive AC electrical power at the first voltage level in a range of about 1,000 V to about 80,000 V. Preferably, the first voltage level is between about 20,000 and about 40,000 V AC. As an example, the first voltage level may be about 36 kV.

Input transformer 22 provides transformation to a second voltage level which may lie within a range of about 200 V to about 5,000 V, preferably of about 500 V to about 4,000 V. In a particular embodiment, the second voltage level may be between about 500 and about 1,000 V, for example about 690 V. Accordingly, the input transformer 22 may transform the received AC electrical power from 36,000 V to 690 V AC.

The rectifier unit 23, which includes rectifier circuitry, such as H-bridge rectifiers for the different phases of the AC electrical power, produces from the transformed AC electrical power DC electrical power at a DC distribution voltage level, which may lie within a range of about 500 V to about 4,000 V. As an example, rectifier unit 23 may receive the 690 V AC and generate a DC distribution voltage of about 1,000 V DC. In other applications, higher distribution voltages may be employed, for example ranging up to 4,000 V DC. When employing AC distribution, corresponding voltages may be used.

The electric power is at the distribution voltage level of 1,000 V DC transmitted to the individual subsea drive units 30. Even with such relatively low voltage levels, the DC distribution can achieve significant transmission distances, for example in excess of one kilometer. The subsea drive units 30 can accordingly be installed a significant distance away from the subsea distribution unit 20.

Due to the voltage drop across the cable connection 32, the received voltage at the inverter 24 might be lower than the output voltage at the intermediate power outputs 31. Inverter 24 generates an AC voltage at a third voltage level, which may be similar to the second voltage level or to the distribution voltage level (i.e. the voltage level at which power distribution occurs in distribution circuit 40). As an example, the third voltage level may lie within the range of about 500 V to about 4,000 V.

The distribution path transformer 26, which is a step-up transformer, then transforms the generated AC electric power from the third voltage level to a fourth voltage level, which may for example be at least two times higher than the third voltage level. The fourth voltage level may lie within a range of about 1,000 to about 10,000 V, e.g. between about 1,500 V and about 6,000 V. A typical subsea load, such as an ESP, may for example be operated at an operating voltage of about 2,000 to about 4,000 V. The distribution path transformer 26 is configured so as to provide a voltage suitable for operation of the respective subsea load 50. Distribution path transformer 26 may thus be configured in accordance with the respective application.

The subsea power distribution system 10 may be configured to provide at each power output 27 an electric power in the range between about 200 kW and about 5 MW. In particular, the power provided at the power outputs 27 may be within the range of about 750 kW to about 2 MW. By providing such output power, the subsea power distribution system 10 will be suitable for operating most medium size subsea consumers, such as ESPs. Furthermore, since the subsea power distribution system 10 comprises two or more subsea drive units 30, and may comprise a plurality of such subsea drive units 30, numerous medium sized subsea loads 50 can be supplied with electric power.

Figure 3:
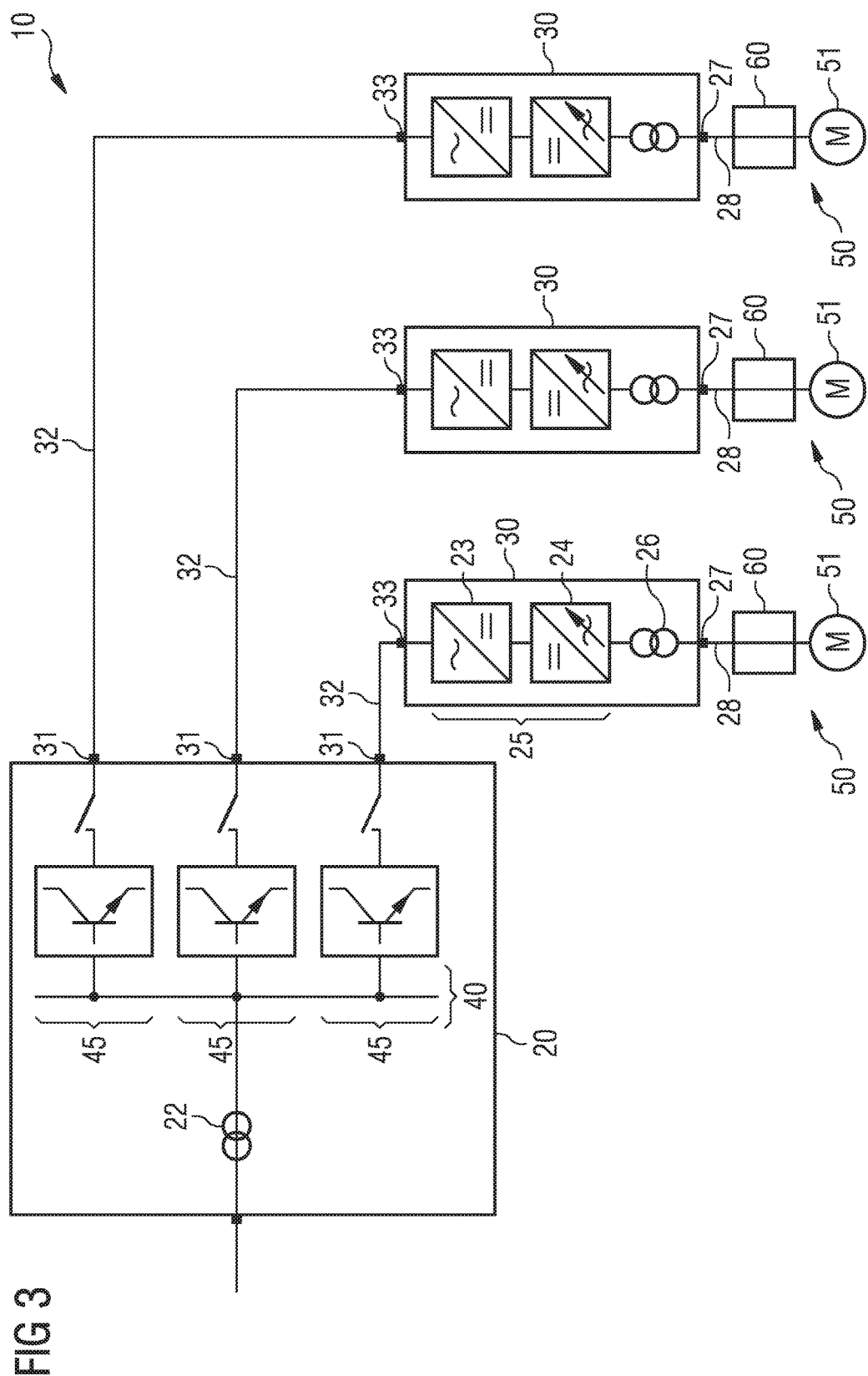
FIG. 3 is a schematic drawing showing a block diagram of a subsea power distribution system according to an embodiment of the invention.

FIG. 3 illustrates a subsea power distribution system 10 according to an embodiment of the invention. The system illustrated in FIG. 3 is a modification of the system of FIG. 2, so the explanations given above are equally applicable to the embodiment of FIG. 3. A difference in the embodiment of FIG. 3 is that the rectifier unit 23 is provided in each power distribution path, in particular it is provided within the respective subsea drive unit 30. The rectifier unit 23 and the inverter 24 of each subsea drive unit 30 form a variable speed drive 25. Variable speed drive 25 allows the electric motor 51 of subsea load 50 to be operated at variable speed. Accordingly, since rectification occurs within the subsea drive units 30, the subsea distribution unit 20 provides AC power distribution. Distribution circuit 40 may accordingly comprise a three-phase distribution circuit, in particular respective distribution busbars.

In even other embodiments, the rectifier unit 23 may be located downstream of the distribution circuit 40, as illustrated in FIG. 3, yet not within the subsea drive units 30, but within the subsea distribution unit 20. In such configuration, AC distribution would be provided by distribution circuit 40, while power transmission over the cable connections 32 would occur with DC electrical power.

FIG. 3 further schematically illustrates several wellheads 60 which are located at different positions on the seabed. In each well, an electric submersible pump is provided and is supplied with electric power via the respective subsea drive unit 30. Subsea drive unit 30 may be located in proximity to the respective wellhead 60. Electric motor 51 forms part of the ESP and may be located downhole within the subsea well. Accordingly, the power distribution system 10 allows the supply of electric power to several ESPs at different wellheads, which can be located kilometers apart and which may be individually driven with variable speed via the respective subsea drive units 30. Note that the embodiment of FIG. 2 may be deployed in a similar way.

FIG. 4 is a flow diagram illustrating a method according to an embodiment of the invention. In a first step S1, input electrical power is received at a first voltage level on the power input 21. The received electrical power is transformed to a second voltage level, which is lower than the first voltage level, via the distribution transformer 22 (step 2). Via the distribution circuit 40, the electrical power is distributed to two or more power distribution paths 45 (step S3).

In step S4, the transformed electrical power which is given out by the input transformer 22 is rectified via a rectifier unit 23 which gives out rectifier electrical power. As mentioned above, the rectification may occur before distribution or after distribution, i.e. it may occur prior to splitting up the electric power to the different power distribution paths or it may occur within the respective power distribution path.

In step S5, the rectified electrical power is inverted via the inverter 24 to obtain AC electrical power at a third voltage level. This occurs within each power distribution path 45. The generated AC electrical power is transformed to a fourth voltage level which is higher than the third voltage level by way of the distribution path transformer 26 (step S6). This again occurs within each individual power distribution path. The transformed AC electrical power is provided in step S7 to a subsea load via the power output 27, and the subsea cable 28.

Embodiments of the invention provide several advantages. By using a relatively low voltage level for the power distribution, low voltage components can be used, such as low voltage rectifiers 23, low voltage inverters 24, and low voltage switches 35, 36. This way, the size and the costs of the subsea power distribution system 10 may be reduced significantly. Furthermore, subsea loads, i.e. consumers, such as ESPs located at different wellheads, which can be kilometers away, can be supplied in an efficient manner with electric power. Additionally, the speed of these consumers can be controlled via the inverters, and soft start and protection are enabled by the semiconductor switches 34. The subsea drive modules further achieve galvanic isolation for the respective subsea load, thus increasing the availability and reliability of the subsea power distribution system. A reliable, efficient and cost-effective way of providing electric power to several subsea loads can thus be provided.

While specific embodiments are disclosed herein, various changes and modifications can be made without departing from the scope of the invention. The present embodiments are to be considered in all respects as illustrative and non-restrictive, and all changes coming within the meaning and equivalency range of the appended claims are intended to be embraced therein.

The invention claimed is:

1. A subsea power distribution system, comprising:
   a power input to receive electrical power at a first voltage level;
   an input transformer coupled to the power input and adapted to transform received electrical power to a second voltage level which is relatively lower than the first voltage level;
   a distribution circuit to distribute received electrical power to two or more power distribution paths; and
   at least one rectifier unit to receive transformed electrical power from the input transformer and output rectified electrical power, wherein each of the two or more power distribution paths includes
   an inverter configured to receive rectified electrical power from the rectifier unit and to output AC electrical power at a third voltage level,
   a distribution path transformer coupled to the respective inverter and configured to transform the output AC electrical power to a fourth voltage level which is relatively higher than the third voltage level,
   a separate breaker or switch,
   a cable,
   a load, and
   a power output to provide the transformed AC electrical power to a subsea load.

2. The subsea power distribution system of claim 1, wherein the power input, the input transformer, the distribution circuit and the at least one rectifier unit form part of a subsea power distribution unit, and wherein each of the two or more power distribution paths includes a subsea drive unit including the respective inverter, distribution path transformer and power output, the subsea power distribution unit and the subsea drive unit being connected via wet-mateable subsea connectors.

3. The subsea power distribution system of claim 2, wherein each of the two or more power distribution paths includes an intermediate power output provided at the subsea power distribution unit, an intermediate power input at the subsea drive unit, and a subsea cable connection between the intermediate power output and the intermediate power input for transmitting electrical power, wherein the subsea power distribution unit and the two or more subsea drive units each include a separate subsea enclosure.

4. The subsea power distribution system of claim 2, wherein the subsea power distribution system is configured to distribute electrical power to subsea well equipment located at different subsea wellheads, wherein the two or more subsea drive units include a first subsea drive unit located in proximity to a first wellhead and a second subsea drive unit located in proximity to a different second wellhead.

5. The subsea power distribution system of claim 1, wherein the rectifier unit is connected between an output of the input transformer and the distribution circuit, the distribution circuit being a DC distribution circuit, each of the two or more power distribution paths being supplied with rectified electrical power from said rectifier unit via the DC distribution circuit.

6. The subsea power distribution system of claim 1, wherein the power distribution system comprises a rectifier unit for each of the two or more power distribution paths.

7. The subsea power distribution system of claim 6, wherein the rectifier unit and the inverter of a respective one of the two or more power distribution paths form a frequency converter unit, in particular a variable speed drive.

8. The subsea power distribution system of claim 1, wherein the first voltage level is a medium voltage level.

9. The subsea power distribution system of claim 1, wherein the second voltage level and the third voltage level each is within a range of about 200 V to about 5,000 V.

10. The subsea power distribution system of claim 1, wherein the fourth voltage level is within a range of about 1,000 V to about 10,000 V.

11. The subsea power distribution system of claim 1, wherein each of the two or more power distribution paths includes a semiconductor switch.

12. The subsea power distribution system of claim 11, wherein the semiconductor switch is controllable to control the output electrical power provided at the power output of a respective one of the two or more power distribution paths.

13. The subsea power distribution system of claim 1, further comprising a controller adapted to control at least the inverters of the two or more power distribution paths.

14. The subsea power distribution system of claim 1, wherein the distribution circuit is a DC distribution circuit, wherein the first voltage level is a medium or high voltage level, wherein the DC distribution occurs at a low voltage level, and wherein the fourth voltage level, at which the electric power is provided to the load, is a medium voltage level.

15. The subsea power distribution system of claim 4, wherein the subsea power distribution system is configured to distribute electrical power to electric submersible pumps.

16. The subsea power distribution system of claim 3, wherein the subsea power distribution system is configured to distribute electrical power to subsea well equipment located at different subsea wellheads, wherein the two or more subsea drive units include a first subsea drive unit located in proximity to a first wellhead and a second subsea drive unit located in proximity to a different second wellhead.

17. The subsea power distribution system of claim 16, wherein the subsea power distribution system is configured to distribute electrical power to electric submersible pumps.

18. The subsea power distribution system of claim 7, wherein the frequency converter unit is a variable speed drive.

19. The subsea power distribution system of claim 8, wherein the first voltage level is a voltage level between about 1,000 V and about 80,000 Volt.

20. The subsea power distribution system of claim 9, wherein the second voltage level and the third voltage level each is within a range of about 500 V to about 4,000 V.

21. The subsea power distribution system of claim 10, wherein the fourth voltage level is within a range of about 1,500 V to about 6,000 V.

22. The subsea power distribution system of claim 19, wherein the second voltage level and the third voltage level each is within a range of about 200 V to about 5,000 V.

23. The subsea power distribution system of claim 22, wherein the fourth voltage level is within a range of about 1,000 V to about 10,000 V.

24. The subsea power distribution system of claim 11, wherein each of the two or more power distribution paths further includes a mechanical switch.

25. The subsea power distribution system of claim 24, wherein the mechanical switch is a contactor.

26. A method of operating a subsea power distribution system, the method comprising:
receiving input electrical power at a first voltage level on a power input;
transforming received electrical power to a second voltage level which is relatively lower than the first voltage level via a distribution transformer;
distributing received electrical power to two or more power distribution paths via a distribution circuit;
rectifying transformed electrical power given out by the input transformer via a rectifier unit which gives out rectified electrical power; and
for each of the two or more power distribution paths, performing the following:
receiving electrical power at a separate breaker or switch,
outputting the received electrical power to a cable,
inverting the rectified electrical power given out by the rectifier unit to obtain AC electrical power at a third voltage level via an inverter,
transforming the AC electrical power to a fourth voltage level which is relatively higher than the third voltage level via a distribution path transformer, and
providing the transformed AC electrical power to a subsea load via a power output.

* * * * *